United States Patent [19]

Fischer et al.

[11] 4,200,250
[45] Apr. 29, 1980

[54] PRESSURE PAD SUPPORT FOR A CASSETTE

[75] Inventors: Karl Fischer; Josef Stebegg, both of Vienna, Austria

[73] Assignee: U.S. Philips Corporation, New York, N.Y.

[21] Appl. No.: 969,648

[22] Filed: Dec. 14, 1978

[30] Foreign Application Priority Data

Jan. 13, 1978 [AT] Austria .................................. 243/78

[51] Int. Cl.² .............................................. G03B 1/04
[52] U.S. Cl. .................................. 242/199; 226/198
[58] Field of Search ......................... 242/76, 197–200; 360/92, 93, 96, 132; 226/198

[56] References Cited

U.S. PATENT DOCUMENTS

| | | | |
|---|---|---|---|
| 3,598,339 | 8/1971 | Saito | 242/199 |
| 3,991,956 | 11/1976 | Machida | 242/199 |
| 4,078,742 | 3/1978 | Steipe | 242/199 |
| 4,087,845 | 5/1978 | Saito | 360/130 |
| 4,131,243 | 12/1978 | Machida | 242/199 |

*Primary Examiner*—Leonard D. Christian
*Attorney, Agent, or Firm*—David R. Treacy

[57] ABSTRACT

A magnetic tape cassette for two pressure pads, has a single rigid bar-shaped support spring loaded in the direction of openings in a side surface, for pressing the tape against scanning elements. The support has two pairs of coaxial projections disposed adjacent each other in its longitudinal direction, and spaced from each other, which projections engage with play with corresponding guide slots which essentially extend perpendicularly to the side surface with the cut-outs, to render the support pivotable and moveable, the ends of the guide slots near the side surface with the cut-outs constituting the stops for the support.

4 Claims, 2 Drawing Figures

PRESSURE PAD SUPPORT FOR A CASSETTE

BACKGROUND OF THE INVENTION

The invention relates to a cassette for accommodating a record carrier in the form of a tape which extends between two winding hubs, and more particularly to a cassette having two cover surfaces and side surfaces interconnecting these two cover surfaces, the record carrier inside the cassette being passed along one of said side surfaces which is formed with at least two openings through which scanning elements can cooperate with the tape. A single movably and pivotably journalled rigid bar-shaped support is arranged substantially parallel to the side surface with the openings, and two spaced adjacent elastic pressure members or pads are mounted on the support each near one of the two openings, which members press the record carrier against the scanning elements which cooperate with said carrier. The support is movably and pivotably journalled by at least one pair of coaxial projections which each extend perpendicularly to one of the two cover surfaces, which projections engage with corresponding guide slots which extend parallel to the cover surfaces and substantially perpendicularly to the side surface with the openings, and the support is loaded towards stops on the cassette side by a spring which acts toward the openings. Such a cassette is commercially available.

In this known cassette the support for the elastic pressure pads which each consist of a felt strip is provided with a single pair of coaxial projections for its movable and pivotable journalling. Furthermore this cassette includes stops on both covering surfaces near the two ends of the bar-shaped support, the support being loaded towards these stops by a helical pressure spring. These stops define a rest position for the support, which position is occupied when no scanning elements have been passed into the cassette through the openings for cooperation with the record carrier which is accommodated in the cassette. Thus, separate devices are provided in the known cassette for journalling the support and for defining its rest position, which is disadvantageous because of the space occupied inside the cassette, in particular when as is generally required the cassette should be of very compact construction.

SUMMARY OF THE INVENTION

It is an object of the invention to design a cassette of this type in such a way that its construction is simplified and more compact. According to the the pressure pad support of such a cassette comprises two adjacent pairs of coaxial projections which are spaced from each other in its longitudinal direction, which projections engage with play with corresponding guide slots, and the stops are constituted by those ends of the guide slots which are disposed adjacent the side surface with the cut-outs. Thus the support is journalled and its rest position is defined by co-operation of the projections formed on said support with the corresponding guide slots, so that separate stops for the support are not required. In addition to a simplified construction this also saves additional space, and allows further miniaturization of such cassettes. Because of the play between the two pairs of coaxial projections and the corresponding guide slots, the bar-shaped support can be moved substantially perpendicularly to the side surface with the cut-outs and can also be pivoted about each of the two pairs of coaxial projections.

The spring which loads the support may then be constituted by known types of springs. However, it is found to be advantageous if the spring which loads the support towards the stops takes the form of a two-arm hairpin spring, which bears against the support with its two arms at the location of each pair of the coaxial projections. This ensures that the support is symmetrically loaded, so that each of the two pressure members produces essentially the same pressure for the record carrier against the relevant scanning element, thus ensuring a correct co-operation of the two scanning elements with the record carrier. Furthermore, it is found to be advantageous in this respect if the support comprises two ridges which extend perpendicularly to the cover surfaces, the arms of the hairpin spring bearing against said ridges. Thus it is achieved that independently of the position of the support obtained as a result of the different penetration depths of the two scanning elements into the cassette the two arms of the hairpin spring always bear against the support at the same locations and that the record carrier is always pressed against the scanning elements under substantially the same conditions. The desired pressure can be determined by a suitable choice of the location of the two ridges and a suitable choice of the force of the hairpin spring. In this way it is always possible to obtain a correct contact between the record carrier and the scanning elements and to realize optimum friction conditions, thus providing maximumlife of the scanning elements, of the record carrier and also of the pressure members.

The invention will now be described in more detail with reference to the drawing which shows an embodiment by way of non-limitative example.

DESCRIPTION OF THE PREFERRED EMBODIMENTS

Figure 1:
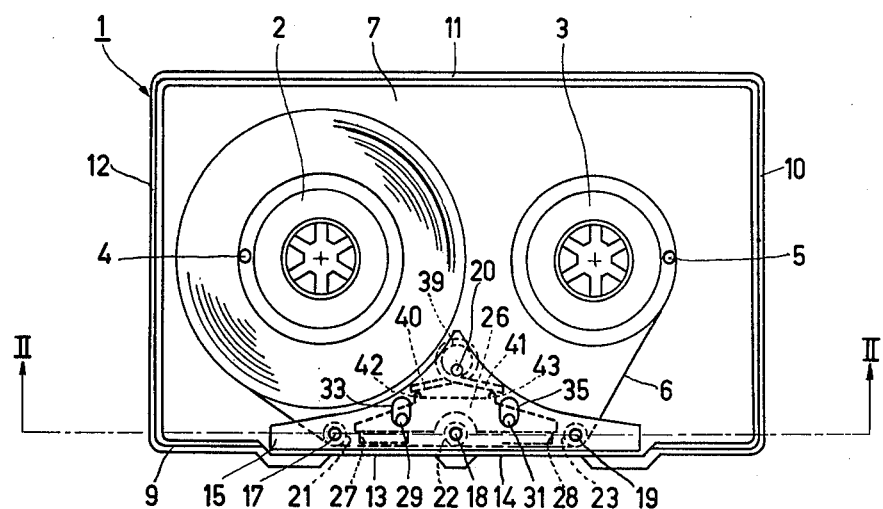
FIG. 1 shows a plan view of a cassette, the upper covering surface not being shown for the sake of clarity.
Figure 2:
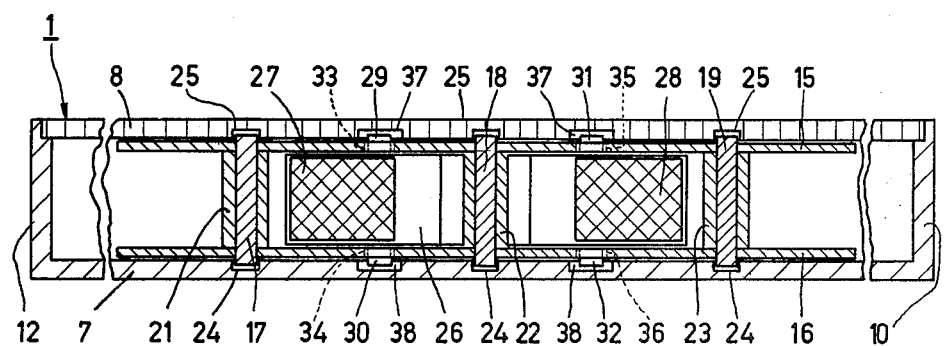
FIG. 2 is a cross-sectional view of this cassette taken on the line II—II in FIG. 1, the scale of FIG. 2 being twice as large as that of FIG. 1.

The cassette 1 shown in FIGS. 1 and 2 comprises two rotatably journalled winding hubs 2 and 3 which are disposed adjacent each other in one plane, to which hubs a magnetizable record carrier 6 in the form of a tape, referred to hereinafter as magnetic tape, is secured by means of a clamping pin 4 and 5 respectively and onto which the tape is wound. FIG. 1 represents the situation in which the magnetic tape 6 has been wound completely onto the winding hub 2.

The cassette 1 also has two cover surfaces 7 and 8 and four side surfaces 9, 10, 11 and 12 which interconnect the two cover surfaces, the cover surface 7 together with the side surfaces constituting a box-shaped cassette housing section, which can be closed by means of the cover surface 8. The side surface 9 has two openings 13 and 14, through each of which a scanning element, not shown, such as a magnetic head for recording and/or reproducing or erasing information on the magnetic tape, can cooperate with the magnetic tape 6 which is passed along that side surface 9 inside the cassette 1.

Near the side surface 9 two bearing plates each extend parallel to the cover surfaces 7 and 8, adjoining these surfaces, which plates are interconnected so as to form a unit by means of four pins 17, 18, 19 and 20 fitted into corresponding bores in the bearing plates. A sleeve 21, 22 and 23 is fitted tightly on each of the three pins 17, 18 and 19, which sleeves are disposed on a straight line parallel to the side surface 9. The three sleeves constitute guides for the magnetic tape 6, so that the path of the magnetic tape near the side surface 9 is defined by these three sleeves. The advantage of such a construction of the tape guides is that the sleeves which co-operate with the magnetic tape may consist of a very hard and friction-resistant material, while the pins may consist of a comparatively soft material, which facilitates deformation of the pins during connection with the sleeves and the bearing plates. The bearing plates 15 and 16 are spaced from each other by the pins 17, 18, 19 and 20 over a distance corresponding to the width of the magnetic tape 6, so that these two plates 15 and 16 guide the magnetic tape in its transverse direction. The two free ends of all the four pins 17, 18, 19 and 20 extend beyond the bearing plates 15 and 16 and engage with corresponding locating holes 24 and 25 in the two cover surfaces 7 and 8 of the cassette. Thus, the position of the complete unit inside the cassette is defined in a simple manner.

Between the two bearing plates 15 and 16 a rigid bar-shaped support 26, whose longitudinal direction is essentially parallel to the side surface 9 with the openings 13 and 14, is arranged so as to be movable and pivotable. Two spaced adjacent elastic pressure members 27 and 28, of for example felt, mounted on said support one near each of the two openings 13 and 14, press the magnetic tape 6 against the scanning elements cooperating with said tape.

For movable and pivotable journalling the bar-shaped support 26 has two longitudinally spaced adjacent pairs of coaxial projections 29, 30 and 31, 32 which project from the support in a direction perpendicular to the cover surfaces 7 and 8 respectively, which projections engage with play with corresponding guide slots 33, 34 and 35, 36 formed in the bearing plates 15 and 16, which slots extend parallel to the cover surfaces and essentially at right angles to the side surface 9. The free ends of the projections 29, 30 and 31, 32 which extend beyond the bearing plates 15 and 16 engage with a recess 37 and 38 respectively formed in the cover surfaces 7 and 8, which recesses are formed so as to allow a free movement of the projections 29, 30 and 31, 32. The ends of the guide slots 33, 34 and 35, 36 near the side surface 9 with the openings then constitute stops for the coaxial projections 29, 30 and 31, 32, the projections being held against the ends of the guide slots constituting the stops by means of a spring 39 which acts in the direction of the side surface 9 with the openings. The spring 39 takes the form of a two-arm hairpin spring, whose loop encircles the pin 20 and whose two arms 40 and 41 each bear against the support 26 near one of the pairs of coaxial projections 29, 30 and 31, 32. The support 26 comprises two ridges 42 and 43 which extend perpendicularly to the cover surfaces 7 and 8, the arms 40 and 41 of the hairpin spring 39 bearing against these ridges.

As previously stated, the two pairs of coaxial projections 29, 30 and 31, 32 engage with play with the corresponding guide slots 33, 34 and 35, 36. Because of this play between the projections 29, 30 and 31, 32 and the guide slots 33, 34 and 35, 36 the support 26 is both movable in the direction of the guide slots and pivotable about each of the two pairs of coaxial projections. Thus, if the scanning elements which cooperate with the two pressure members 27 and 28 on the support 26 penetrate the cassette different distances through the openings 13 and 14 it is ensured that the two members apply equal pressure.

As is evident from the foregoing, the present construction provides a cassette of very simple and compact design. By providing two pairs of coaxial projections which engage with corresponding guide slots, a particularly simple and reliable movable and pivotable bearing arrangement for the support is obtained. In addition, the ends of the guide slots near the side surface 9 at the same time constitute the stops for the support which define its rest position, so that separate stops may be dispensed with, which is advantageous in respect of the space which is required. In this respect it is to be noted that in the cassette in accordance with the invention a tape guide for the magnetic tape can be arranged advantageously so that it directly adjoins the ends of the bar-shaped support. Thus, it is achieved that these two tape guides can be arranged nearest one another, so that a minimal angle of contact of the magnetic tape with the tape guides is obtained, which is of advantage in respect of a minimal friction. Furthermore it is to be noted that the hairpin spring suitably loads the support in a perfectly symmetrical manner, so that the two pressure members exert substantially the same pressure on the scanning elements. As a result of the two ridges on the support, the locations where the two spring arms act on the support are always well defined independently of the position of said support owing to different penetration depths of the scanning elements into the cassette, so that independently of the position of the support the spring arms always exert substantially the same force on the support. This ensures that the pressure between the pressure members and the scanning elements remains always substantially the same independently of the position of the support.

What is claimed is:

1. A cassette for a record carrier formed as a tape extending between two winding hubs, comprising
two cover surfaces,
two winding hubs arranged between said cover surfaces,
a tape extending between said hubs,
side surfaces interconnecting said cover surfaces, one of said side surfaces having at least two openings arranged to permit scanning elements to cooperate with the tape,
a support arranged with a longitudinal direction substantially parallel to said one side surface between said cover surfaces,
means for movably and pivotably journalling said support with respect to said cover surfaces, said means comprising a pair of coaxial projections extending perpendicular to one of said cover surfaces, and corresponding guide slots extending parallel to the cover surfaces and substantially perpendicular to said one side surface, each coaxial projection engaging a respective slot,
two elastic pressure members supported on said support spaced from each other, each near a respective opening, arranged to press the tape against scanning elements, and
spring means for biasing the support toward said one side surface into contact with stop surfaces,
wherein said means for journalling said support comprises two adjacent pairs of said coaxial projections, spaced from each other in said longitudinal direction; and two respective pairs of guide slots in which the projections engage with play; and said guide slots have ends adjacent to said one side surface arranged as stops toward which the support is biased by said spring means.

2. A cassette as claimed in claim 1 wherein said spring means comprises a hairpin spring having two arms, each arm bearing against the support at a location adjacent a pair of coaxial projections.

3. A cassette as claimed in claim 2 wherein the spring has a loop intermediate said arms, said loop encircling a pin fixed between said two cover surfaces.

4. A cassette as claimed in claim 1 wherein the support has two ridges extending perpendicular to the cover surfaces, the arms of the hairpin spring bearing against said ridges.

* * * * *